United States Patent [19]

Hoisington et al.

[11] Patent Number: 5,075,689

[45] Date of Patent: Dec. 24, 1991

[54] BIDIRECTIONAL HOT MELT INK JET PRINTING

[75] Inventors: Paul A. Hoisington, Norwich, Vt.; Edward R. Moynihan, Plainfield, N.H.; Charles W. Spehrley, Jr., Hartford, Vt.; Robert R. Schaffer, Canaan, N.H.

[73] Assignee: Spectra, Inc., Hanover, N.H.

[21] Appl. No.: 441,365

[22] Filed: Dec. 15, 1989

Related U.S. Application Data

[63] Continuation-in-part of Ser. No. 359,736, May 31, 1989.

[51] Int. Cl.$^5$ .............................................. B41J 2/21
[52] U.S. Cl. .................................. 346/1.1; 346/140 R
[58] Field of Search ................... 346/140, 1.1; 358/75

[56] References Cited

U.S. PATENT DOCUMENTS

| | | | |
|---|---|---|---|
| 4,528,576 | 7/1985 | Koumura | 346/140 |
| 4,533,928 | 8/1985 | Sugiura | 346/140 |
| 4,540,996 | 9/1985 | Saito | 346/140 |
| 4,593,295 | 6/1986 | Matsufuji et al. | 346/140 |
| 4,714,936 | 12/1987 | Helinski | 346/140 |
| 4,721,635 | 1/1988 | Helinski | 346/135.1 X |
| 4,750,009 | 6/1988 | Yoshimura | 346/140 |
| 4,779,099 | 10/1988 | Lewis | 346/140 X |
| 4,853,706 | 8/1989 | Van Brimer | 346/140 X |
| 4,864,328 | 9/1989 | Fischbeck | 346/140 |
| 4,992,806 | 2/1991 | Peer | 346/140 |

Primary Examiner—Joseph W. Hartary
Attorney, Agent, or Firm—Brumbaugh, Graves, Donohue & Raymond

[57] ABSTRACT

In the representative embodiments of the invention described in the specification, an ink jet head has a series of aligned arrays of ink jet orifices arranged to project drops of different colored inks in sequence to the same location on a substrate during each scan of the ink jet head adjacent to the substrate. The spacing of the orifices in each aligned array and the speed of the ink jet head during the scanning are arranged so that all the ink drops applied at the same location on the substrate are applied in a time period of no more than about 100 milliseconds and preferably no more than 50 milliseconds. Moreover, to avoid banding the lines produced by successive scans of the head are interlaced so as to produce a periodic frequency of no more than about four lines per millimeter.

26 Claims, 2 Drawing Sheets

BIDIRECTIONAL HOT MELT INK JET PRINTING

REFERENCE TO RELATED APPLICATION

This application is a continuation-in-part of the copending application of Paul A. Hoisington, Ser. No. 07/359,736, filed May 31, 1989, for "Reduced Banding in Bidirectional Ink Jet Printing".

BACKGROUND OF THE INVENTION

This invention relates to bidirectional hot melt ink jet printing systems and, more particularly, to a new and improved hot melt ink jet printing system which provides improved image quality.

In conventional ink jet printing systems, a reciprocating ink jet head having an array of ink jet orifices projects corresponding arrays of ink drops onto a substrate and, for bidirectional printing, the ink drops are applied during each pass of the ink jet head during its reciprocating motion in opposite directions adjacent to the record medium. When a bidirectional ink jet printing system is arranged to provide hot melt ink printing, certain problems may arise which result in degradation of the quality of the image produced by the printing. For example, as described in the copending application Ser. No. 07/359,736, banding may result from variations caused by bidirectional printing and this can be made less apparent by interlaced bidirectional printing. On the other hand, where two adjacent hot melt ink lines are printed in succession during opposite successive motions of a printhead, the first line may not be fully solidified before the second line is printed. If the successive adjacent lines are laid down in two different colors, the inks may coalesce along the border between the lines, producing an undesired line of the composite color.

Even if there is no undesirable mixing of colors, the heat transfer resulting from application of the first line increases the temperature of the adjacent substrate region. As a result, if the line applied during the next scan of the ink jet head is immediately adjacent to the preceding line, the increased substrate temperature in the region where the second line is applied may cause the ink in that line to spread to a greater extent, producing a different image quality.

Furthermore, when two primary colors are overprinted to produce a composite color, the first color often spreads on the substrate to a greater extent than the second color spreads on the first color, so that each drop of the second color ink is surrounded by a marginal region in which only the first color has been printed. This causes the hue of the composite color to be shifted toward that of the first color printed. When different adjacent regions made up of the same composite color are printed by application of the primary colors in reverse order, which may occur during bidirectional color printing, the hues of the composite color in the adjacent regions will be shifted toward that of the primary color first applied, so that regions in which the composite color is applied in opposite directions will show color banding. In addition, the second ink to be applied in the same region will not usually flow into the substrate, which may result in lower adhesion, leading to chipping or flaking of the second ink from the image.

SUMMARY OF THE INVENTION

Accordingly, it is an object of the present invention to provide a new and improved hot melt ink jet printing system which overcomes the above-mentioned disadvantages of the prior art.

Another object of the invention is to provide a new and improved printing system in which variations in the hue of a composite color resulting from bidirectional printing are avoided.

A further object of the invention is to provide a system for producing a composite color image in which a subsequent primary color applied to a first primary color is not subject to chipping, flaking or other adhesion problems.

These and other objects are attained according to one aspect of the invention by providing a hot melt color ink jet printing system in which a second primary color ink is printed over a first primary color ink before the first primary color ink has solidified. In this way, mixing of the two primary color inks can be effected so that a composite color of the same hue is provided throughout the region in which both primary color inks are applied and also assuring good adhesion of the second ink to be applied.

For this purpose, an ink jet head is provided having a plurality of orifices from which inks of different colors are printed, in which the orifices are arranged to apply different primary color inks to the same location on a record medium in closely spaced succession, so that drops of a first primary color ink applied to the region of the medium are still at least partially molten when superimposed drops of another color ink are applied to the same region. Thus, differential spreading of the two inks on the substrate and problems resulting from inadequate adhesion of the second ink are eliminated.

The time delay between the application of the first and second ink drops at the same location on the substrate may vary depending upon the difference between the melting point and the application temperature of the inks and temperature of the substrate. In general, however, the time delay should be less than about 100 milliseconds and, preferably, less than about 50 milliseconds in order to assure that the first ink drop to be applied is still sufficiently fluid to permit mixing when the last drop is applied. One form of ink jet apparatus in accordance with this aspect of the invention has a reciprocating ink jet head arranged to scan a substrate at a rate of at least 10 cm/sec. and, preferably, at least about 100 cm/sec., in which the ink jet orifices supplying different colors of ink are aligned in the direction of scanning motion of the head and are spaced by no more than about 10 cm., desirably by no more than about 5 cm, and preferably by no more than about 2 cm.

According to another aspect of the invention, the lines of ink drops produced by the aligned orifices during one scan of the ink jet head have a spacing greater than the line spacing in the image to be produced, and the image lines located between the lines produced during one scan of the ink jet head are formed during one or more subsequent scans of the ink jet head. In this way, color banding resulting from hue variations is rendered less detectable. Preferably, each line produced during a scan of the ink jet head is spaced from a line produced during the previous scan by at least one line width to reduce thermal interaction between the lines.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENT

Figure 1:
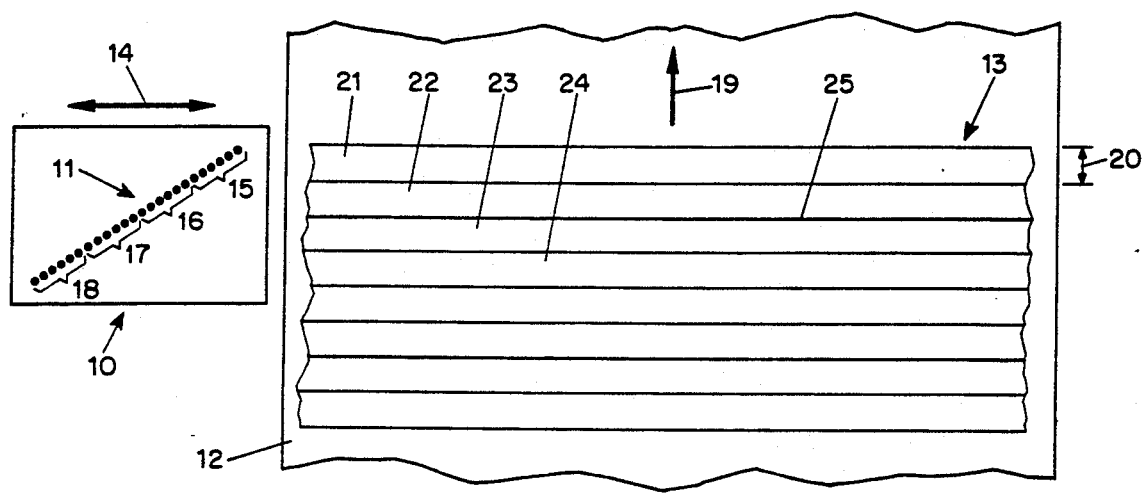
FIG. 1 is a schematic diagrammatic view illustrating the operation of a typical prior art color ink jet system.

In the schematic illustration of FIG. 1 showing the operation of a typical prior art color ink jet system, an ink jet head 10 has an array 11 of orifices from which ink is ejected drop by drop onto a substrate 12 during successive reciprocating motions of the head 10 in the direction indicated by the arrow 13 so as to produce a pattern 14 on the substrate. To produce a color image, the array 11 of orifices is divided into four orifice groups 15, 16, 17 and 18, each having, for example, six orifices, to apply four different color inks, such as yellow, magenta, cyan and black, respectively, to the substrate 12. For bidirectional color printing, i.e., printing during motion of the head in both directions, the substrate 12 may be advanced in the direction of the arrow 19 after each scan of the head 10 by a distance 20 which is equal to the length of each of the orifice groups 15-18 in the direction of motion 19 of the substrate.

In order to provide high-resolution printing, the spacing in the direction of motion of the substrate 19 between the adjacent orifices in the array 11 should be as small as possible and, to provide an ink jet head having a smaller effective spacing, the array of orifices is usually tilted at an angle with respect to the direction of reciprocating motion 13 of the head, as illustrated in FIG. 1. In addition, closer spacing of the lines produced by the ink jet head may be obtained by interlaced scanning, in which the substrate 12 is advanced by a distance corresponding to an odd multiple of half the spacing of the orifices in the direction of the arrow 19 after each scan of the head, as described in the above-mentioned copending application. In the schematic illustration of the head 10 shown in FIG. 1, only 24 orifices in the array 11 are shown, but it will be understood that the array may be extended so that a larger number of orifices, such as 48, 72 or 96, is provided.

In the type of operation in which the substrate 12 is advanced in the direction 19 by a distance 20 between successive transverse motions of the ink jet head 10, the ink applied to the substrate by the groups of orifices 15, 16, 17 and 18 will appear in four adjacent bands 21, 22, 23 and 24, respectively, during the first scan of the head and, during the next scan, each group of orifices will apply the corresponding color ink to the next adjacent band in the group so that after four successive scans all four colors of ink have been applied at the appropriate locations in the band 24 so as to produce the desired composite colors. Similarly, successive scans of the head 14 adjacent to each of the other bands in the image 13 produces composite colors in those regions.

In such color printing systems, certain problems arise. For example, printing of one color in a region immediately adjacent to a region printed with another color before the first printed color has solidified may cause the two colors to mix and produce an undesired line of the composite color between the regions. Thus, for example, if magenta ink from the orifices 17 in the head 10 is applied concurrently with or immediately after cyan ink from the orifices 16 is applied and before that ink has solidified, the magenta and cyan inks along the line between the bands 22 and 23 in the image 13 may flow together and coalesce to produce an undesired blue line 25 between them. Moreover, even if the adjacent constituent color inks do not mix to produce an undesired color line in this way, the thermal transfer between the region in which one line is printed to the region in which an adjacent line is to be printed at the same time or immediately thereafter causes the ink in the second line to spread to a different extent, resulting in image irregularities.

In many cases it is desirable to have two or more groups of orifices providing the same color ink in an array of orifices in an ink jet head. Thus, for example, the array 11 may be extended by adding two or more sets of orifice groups similar to the orifice groups 15-18. In such cases, it is possible to produce a given composite color by printing the constituent colors in either order, i.e., blue may be produced by printing first magenta and then cyan or first cyan and then magenta. Because the second color to be applied usually does not spread as much as the first color applied, however, some of the ink in each drop of the first color to be applied will not be covered completely by a corresponding drop of the second color to be applied, causing the hue of the composite color to be shifted toward that of the first ink color. Thus, the hue of a blue color produced by printing cyan before magenta will be shifted slightly toward the blue, and the hue of a blue produced by printing magenta before cyan will be shifted slightly toward magenta. Consequently, when two adjacent bands of a composite color are produced by printing the constituent colors in the reverse order, a detectable banding may result, as described in the above-mentioned copending application.

In accordance with the invention, a bidirectional color hot melt ink jet system is arranged to overprint one or more additional colors at the same region on the substrate before the first printed color has solidified, thereby assuring mixing of the constituent color inks and avoiding differences in the spreading of drops of successively printed colors which cause variations in hue. For this purpose, an ink jet head is provided in which each of the orifices which applies a primary color ink to the substrate is aligned in the direction of motion of the ink jet head with orifices for applying the other primary color inks and closely spaced therefrom so that, during each pass of the ink jet head adjacent to the substrate, drops of all three primary colors may be applied in succession within a limited time period to the same region of the substrate.

Since hot melt ink substantially solidifies on a substrate within about 100 milliseconds after application and usually within about 50 milliseconds, the spacing of the orifices and the rate of motion of the ink jet head are selected to assure that all drops of constituent ink required to produce a composite color are applied to the same region of the substrate in substantially less than 100 milliseconds, desirably less than 50 milliseconds, and, preferably less than about 25 milliseconds. Thus, with a head 10 scanning the substrate 12 at a rate of 100 cm/sec., the spacing between the orifices supplying the first and last drops of ink at the same region of the substrate to form a composite color should be spaced by no more than 10 cm., desirably no more than 5 cm., and preferably no more than about 2.5 cm. For slower scan rates such as 20 cm/sec., correspondingly smaller maximum orifice spacings such as 2 cm., desirably 1 cm. and, preferably, 0.5 cm. should be provided. At a scan rate of 10 cm/sec. the maximum spacing should be no more than 1 cm. and preferably 0.5 cm.

Figure 2:
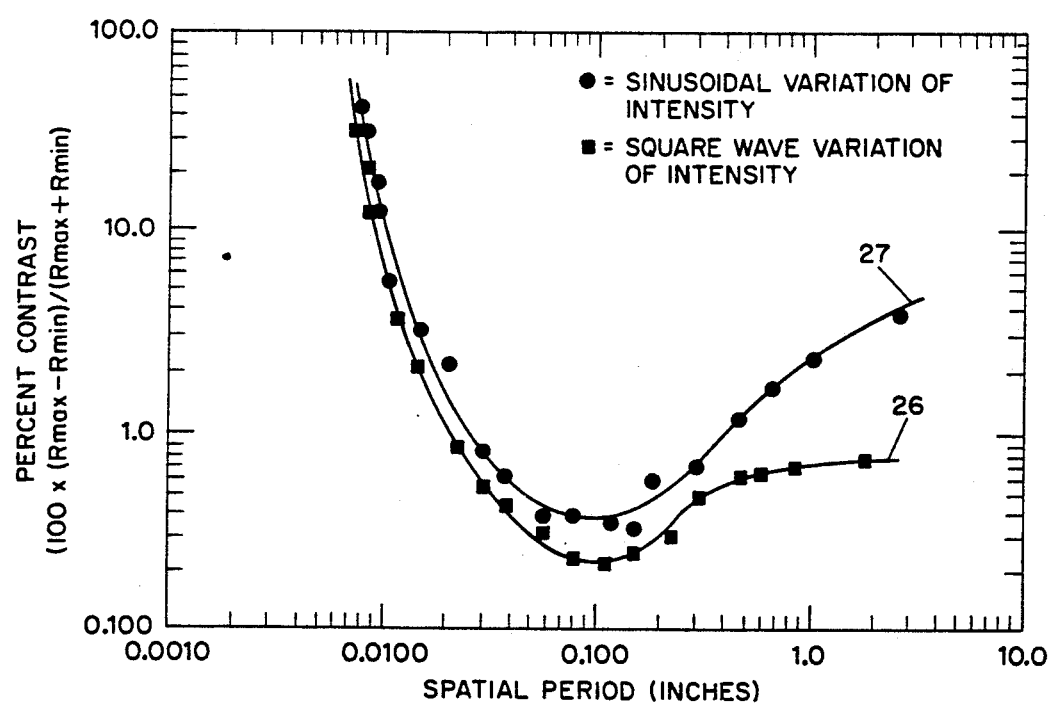
FIG. 2 is a graphical representation illustrating the threshold for visual detectability of image banding as a function of contrast and spatial period.

As previously mentioned, bidirectional ink jet printing may cause variations in density or hue which produce visually detectable color banding. For example, as described above, the hue of colors produced by overprinting a combination of primary colors may vary depending upon the order in which the primary colors are applied to the substrate. FIG. 2 illustrates on a logarithmic scale the effect of variations in contrast between adjacent bands of differing spatial period, with percent contrast represented on the ordinate scale, and variations in the spatial period represented in inches on the abscissa scale, on the visual detectability of such bands in an ink jet image. The line 26 in FIG. 2 represents the limit of visual detectability when the banding is a square wave function of intensity and the line 27 in FIG. 2 represents the limit when the banding is a sinusoidal function of intensity. As shown by both the lines 26 and 27, where the contrast between adjacent bands is 10%, banding is detectable for all spatial periods greater than about 0.01 inch (0.25 mm), whereas for 1% contrast between adjacent bands, banding is detectable for sinusoidal variations in density only if the spatial period is between about 0.02 and about 0.5 inch (0.5 mm) and 1.25 mm) and for square wave variations of density at all spatial periods above 0.02 inch (0.05 mm).

Figure 3:
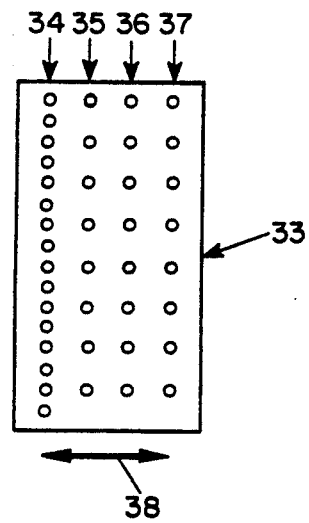
FIG. 3 is a schematic diagrammatic view illustrating the arrangement of ink jet orifices in a representative ink jet head in accordance with the present invention.

FIG. 3 illustrates the arrangement of orifices in one form of ink jet head arranged to produce both black and multicolor printing in accordance with the invention. In this case, a head 33 has an array 34 consisting of 16 orifices arranged to project black ink and three adjacent arrays 35, 36 and 37 of eight orifices each arranged to project yellow, magenta and cyan inks, respectively, these orifices being aligned with the alternate orifices in the array 34 and have a total spacing, for example of 1 cm. When the head 33 is used for bidirectional color printing, all of the colored ink orifices in the arrays 35, 36 and 37 and the eight black ink jet orifices in the array 34 which are aligned in the scanning direction 38 with the colored ink orifices are used, and the substrate is advanced by an odd multiple of half the distance between adjacent color ink orifices between successive passes (80 lines per cm.), for example, so that interlaced lines are provided. Thus, with image line spacings of 200 lines per inch (80 lines per cm) for example, any differences in intensity or hue resulting from the reversal of the order of laying down of colored ink drops has a spatial period which is less than the lower limit for visual detection of the banding effect as shown in FIG. 2.

Moreover, because each color ink orifice in the arrays 35, 36 and 37 is aligned with other color ink orifices in the direction of motion of the head 33 and those orifices are closely spaced on the head, with a scanning speed of, for example, 20 cm. per second, the successive drops of different color inks applied to the same region of the substrate to produce a composite color image will be applied within about 50 milliseconds, i.e., before the first drop has solidified. Consequently, the inks will be mixed and hue variations resulting from application of the inks in reverse order will be avoided.

When the head 33 is used to print black images, the entire array of black orifices 34 may be utilized. In this case, the substrate is advanced by a distance equal to the length of the array 34 plus the distance between adjacent orifices in that array between successive passes of the head, thereby producing images at twice the speed of color printing. If edge raggedness results from position errors between passes, only alternate orifices in the array 34 are used, and the lines produced by successive passes of the ink jet head are interlaced in the manner described in the copending application Ser. No. 07/359,736, filed May 31, 1989.

Figure 4:
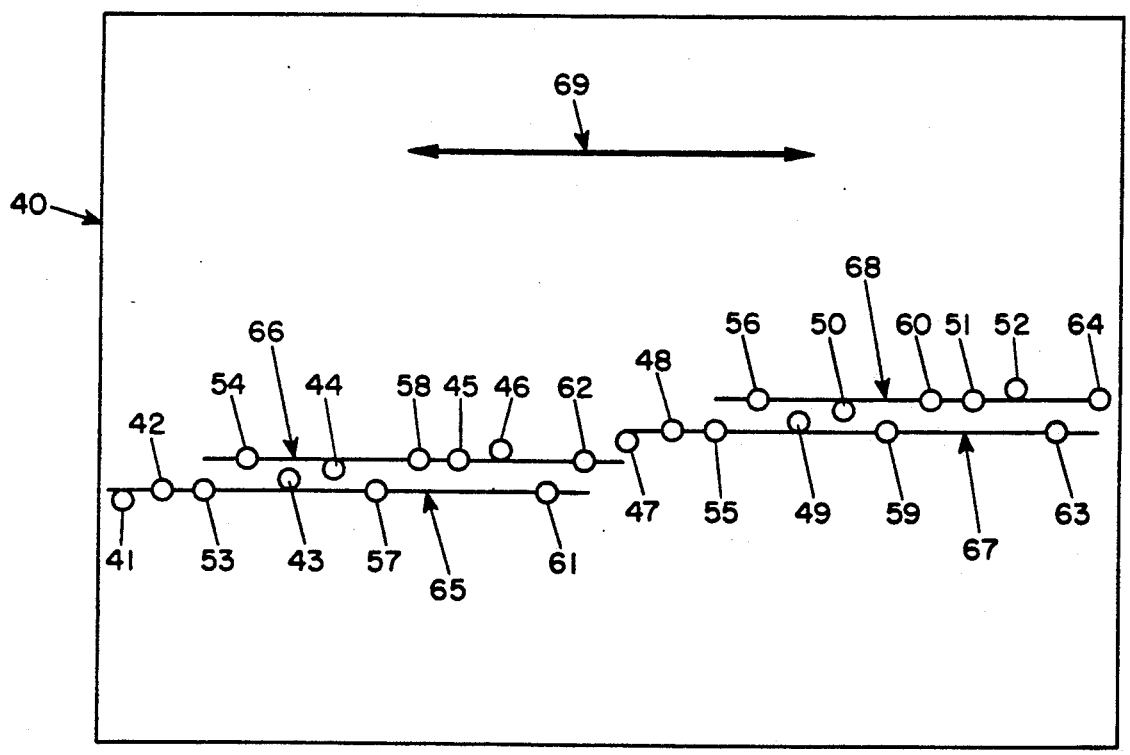
FIG. 4 is a schematic diagrammatic view illustrating the arrangement of ink jet orifices in another form of ink jet head in accordance with the invention.

FIG. 4 illustrates another arrangement of orifices in an ink jet head to provide prompt application of drops of the constituent colors of a composite color in accordance with the invention. In this case, the array of orifices contains three times as many orifices for black ink as for each of the primary colors, yellow, magenta and cyan, thereby permitting images consisting solely of black ink to be printed at three times the speed of images containing color.

In the enlarged schematic illustration of FIG. 4, an ink jet head 40 has twelve black orifices 41–52 arranged in adjacent pairs, and three sets of four orifices each 53–56, 57–60 and 61–64 for each of the primary colors, cyan, magenta and yellow, respectively, are arranged in adjacent pairs. As indicated by the four parallel lines 65, 66, 67 and 68, which extend parallel to the direction of reciprocating motion of the head, represented by the arrow 69, each of the primary color orifices is aligned with one of each of the other primary color orifices and one black orifice in the direction of motion of the head. Thus, the black orifice 42, the cyan orifice 53, the magenta orifice 57 and the yellow orifice 61 are aligned along the line 65 in the direction of motion of the head 40, and the cyan orifice 54, the magenta orifice 58, the black orifice 45 and the yellow orifice 62 are aligned along the line 66. In addition, two black orifices 43 and 44 are uniformly spaced between the lines 65 and 66 so that, color mixing is involved, those orifices, along with the black orifices on the lines 65–68 and the other black ink orifices which do not lie on those lines can be used to print images at a rate three times as fast as the color printing rate. With the orifices for projecting the same color ink arranged in adjacent pairs, the advantages described in the Hoisington et al. U.S. Pat. No. 4,835,554 can be provided.

For color printing, the spacing of the lines 65, 66, 67 and 68 preferably does not correspond to the spacing of adjacent lines in the final image printed on the substrate. Instead, the scanning is arranged so that the spacing of the lines in the final image printed on the substrate is a fraction, such as one-sixth or one-eighth, of the spacing of the lines shown in FIG. 4 by causing the substrate to be advanced by a distance which is smaller than that spacing between successive scans of the printhead in the manner described hereinafter. In addition, although only 24 orifices are shown in the schematic illustration of FIG. 4, the orifice array may be extended to include a larger number of orifices such as 48, 72 or 96 orifices.

For convenience of manufacture, the minimum spacing in the scanning direction between adjacent orifices is preferably no less than about 0.5 mm. Thus, the first and last orifices disposed on each of the lines 65, 66, 67 and 68 may be spaced about 5 mm. so that, with a scanning rate as low as 10 cm/sec., the time between application of the first and last drops of ink at the same location is less than about 50 milliseconds. At higher scanning rates, such as 100 cm/sec., the time between the first and last drop application is correspondingly lower, such as 5 milliseconds.

Consequently, with this arrangement, as with that of FIG. 3, the last drop of a constituent color of a hot melt ink required to produce a composite color is applied at the same region before the first drop has solidified, thereby causing the different colors to be mixed. This prevents hue variations in the composite color which could result from spreading of a first constituent color ink drop to a greater extent than a subsequent constituent color ink drop. Therefore, the hue of the composite color will not be changed as a result of a different order of application of the constituent drops resulting from application of the constituent colors in the opposite order during motion of the printing head in opposite directions in a bidirectional printing system.

In order to avoid thermal interaction between the ink in one line of an image and the ink in a subsequently printed line which can cause different ink spreading and possible mixing of constituent colors to produce an undesired composite color line, the ink jet printing system of the invention is preferably arranged so as to assure that no line of a color image is printed within two image lines of an image line printed during the previous scan of the head. For this purpose, the lines 65–68 of FIG. 4 containing the primary color ink orifices have a spacing of at least four image lines, such as six image lines, i.e., a spacing which requires five scans of the head 40 to produce the lines intervening between the image lines printed by the orifices on the lines 65–68 during one scan.

For color printing with this arrangement, only the orifices located on the lines 65–68 are used and, in the illustrated embodiment, only four lines are printed during each scan. With this arrangement, advancing the substrate by successive sequences of image line increments of 2, 2, 3, 2, 2 and 13 produces a complete color image. If the image line spacing is 150 per inch (6 per mm.), any bidirectional banding effect which might result, for example, from variations in the time of flight of drops applied to the substrate during motion of the head in opposite directions, is below the visual threshold described above with respect to FIG. 2. If a larger number of orifices such as 48 or 96 is provided, with a corresponding increase in the number of color lines printed during each scan, the last substrate advance in the foregoing sequence is correspondingly increased, i.e., to 37 or 85 lines rather than 13 lines. When no color is required in the image, all of the black orifices are used and, since those orifices are spaced by two image lines in the illustrated embodiment, the substrate may be advanced in the manner described in the above-mentioned copending application to avoid edge raggedness, for example, one image line after one pass and 23 images lines after the next pass.

With image lines spaced at 150 per inch (6 per mm.), the average interlace frequency provided by this arrangement is 100 per inch (4 per mm.). As shown in FIG. 2, any banding produced by this arrangement is not detectable unless the contrast between adjacent bands exceeds about 10%.

If an array having more than 24 orifices is provided, such as a 96-orifice array, it is possible to make the successive substrate advance distances more uniform by adding appropriate multiples of 6 to each of the increments in the sequence specified above. The most uniform sequence of substrate advance distances in this case would be 14, 20, 15, 14, 14, 19. Since more uniform substrate advance distances allow for greater substrate advance accuracy, this arrangement may be desirable in many cases. In addition, any density variations which might be periodic at 96 lines with a 96-orifice array are distributed among six different regions of the image, causing the variations to occur at a higher spatial frequency.

If the aligned arrays of orifices on the lines 65–68 were spaced by only two or three image lines rather than six image lines, undesired thermal interaction might occur as described above. While such thermal interaction may be avoided if the lines of orifices are spaced by four image lines, this arrangement requires two successive substrate advances of two image lines, followed by a skip to avoid overprinting of the lines printed during the first scan. Moreover, with image lines spaced at 150 per inch (6 per mm.), the interlace frequency at four-image-line spacing of the lines is only 75 per inch (3 per mm.) which could result in detectable banding if the contrast between adjacent bands is 3% as shown in FIG. 2.

On the other hand, a spacing of eight image lines for the lines of the orifices 65–68 provides the same advantages as the above-described arrangement having a spacing of six image lines. In addition, with a substrate advance sequence of seven advances of three image lines each followed by an eleven-line advance, a complete image can be formed. With a line spacing of 150 per inch (6 per mm.), the interlace frequency in the image is 150 per inch (6 per mm.), eliminating any detectable banding regardless of contrast as shown in FIG. 2. If the number of orifices in the array is greater than 24, the sequence of substrate advances should consist of seven three-line advances followed by an advance of, for example, 25 lines for a 48-orifice array printing eight lines per scan or 73 lines for a 96-orifice array printing sixteen lines per scan. Moreover, by adding appropriate multiples of eight to each of the first seven substrate advance increments, more uniform substrate advance distances may be obtained in a manner similar to that described above with respect to the embodiment having a spacing of six image lines.

Although the invention has been described herein with reference to specific embodiments, many modifications and variations therein will readily occur to those skilled in the art. For example, the black and color orifice arrays 34 and 35–37 in the head 33 shown in FIG. 3 could be oriented at different angles to the direction of motion of the printhead, in a manner similar to that described in connection with FIG. 2 of the Fischbeck U.S. Pat. No. 4,864,328, but with the different color orifices in the arrays and some of the black orifices aligned in the direction of motion of the printhead. Accordingly, all such variations and modifications are included within the intended scope of the invention.

We claim:

1. A bidirectional hot melt ink jet printing system comprising substrate support means for supporting a substrate on which a hot melt ink image is to be printed, reciprocating ink jet head means mounted for reciprocating scanning motion with respect to the surface of a substrate supported on the substrate support means for projecting drops of hot melt ink selectively onto the substrate to form a desired image, substrate advance means for advancing the substrate in a direction transverse to the direction of motion of the ink jet head means, and orifice means in the ink jet head means from which hot melt ink is ejected toward the surface of the substrate including a plurality of orifices aligned in the direction of motion of the ink jet head for projecting drops of different color hot melt ink in succession onto the same region of the surface of the substrate, wherein the spacing of the aligned orifices and the rate of motion of the ink jet head means with respect to the substrate are arranged so that the last drop of ink projected by one of the aligned orifices is received on the surface of the substrate within about 100 milliseconds after the first drop of ink projected by one of the aligned orifices at the same region of the substrate surface is received to cause mixing of the different color ink drops in the molten state so as to reduce variations resulting from application of different inks from the orifices in reverse order during oppositely directed scanning motions of the ink jet head.

2. An ink jet system according to claim 2 wherein the spacing of the aligned orifices and the rate of motion of the ink jet head means are arranged so that the time between the application of the first and last ink drops from the aligned orifices to the same region on the substrate surface is no more than about 50 milliseconds.

3. An ink jet system according to claim 1 wherein the maximum distance between the aligned orifices is no more than about 10 cm.

4. An ink jet system according to claim 1 wherein the maximum distance between the aligned orifices is no more than about 5 cm.

5. An ink jet system according to claim 1 wherein the maximum distance between the aligned orifices is no more than about 2.5 cm.

6. An ink jet system according to claim 1 wherein the rate of motion of the ink jet head means with respect to the substrate is at least about 10 cm per sec.

7. An ink jet system according to claim 1 wherein the rate of motion of the ink jet head means with respect to the substrate is at least about 20 cm per sec.

8. An ink jet system according to claim 1 wherein the rate of motion of the ink jet head means with respect to the substrate is at least about 100 cm per sec.

9. An ink jet system according to claim 1 wherein the aligned plurality of orifices includes four orifices for projecting ink of three primary colors and black, respectively.

10. An ink jet system according to claim 1 wherein the orifice means includes at least two pluralities of orifices aligned in the direction of motion of the ink jet head means and spaced in the direction perpendicular thereto by at least twice the spacing of the lines in an image to be produced on a substrate by the ink jet system so as to produce a plurality of spaced lines on the surface of a substrate during each scan of the ink jet head means.

11. An ink jet system according to claim 10 wherein the substrate advance means is arranged to advance the substrate by a distance less than the spacing between adjacent aligned pluralities of orifices in the ink jet head means between successive scans of the ink jet head means with respect to a substrate.

12. An ink jet system according to claim 10 wherein the spacing of adjacent pluralities of aligned orifices in the orifice means corresponds to six image lines in an image to be produced on a substrate by the ink jet system.

13. An ink jet system according to claim 12 wherein the substrate advance means is arranged to advance the substrate in a sequence of five steps corresponding to image line increments of 2, 2, 3, 2, 2, or those numbers with one or more multiples of six added to one or more of them, respectively, followed by a further increment which depends upon the number of lines printed during each scan of the ink jet head means, to form a complete image.

14. An ink jet system according to claim 12 wherein the spacing between adjacent aligned pluralities of orifices corresponds to eight image lines in an image to be printed on a substrate and the substrate advance means is arranged to advance the substrate in a sequence consisting of seven consecutive increments of three, or three with one or more multiples of eight added to one or more of them, image lines each, followed by a further increment which depends upon the number of lines printed during each scan of the ink jet head means, to form a complete image.

15. An ink jet system according to claim 10 wherein each aligned plurality of orifices includes three primary color ink orifices and one black ink orifice and wherein the orifices in adjacent aligned pluralities which project the same color ink are disposed in adjacent pairs.

16. An ink jet system according to claim 15 including a plurality of further orifices arranged to project drops of black ink and disposed at uniform intervals between the aligned pluralities of orifices.

17. An ink jet system according to claim 16 wherein the orifices for projecting black ink are disposed in adjacent pairs.

18. A hot melt ink jet system for producing a hot melt ink image on a substrate comprising substrate support means for supporting a substrate on which an image is to be produced, ink jet head means mounted for reciprocating motion with respect to the substrate support means to project different color ink drops onto a substrate supported thereon along a plurality of spaced image lines during scanning of the ink jet head means in either direction, the different color ink drops projected to the same location on the substrate being applied within about 100 milliseconds to cause mixing of the drops in the molten state, and substrate advance means for moving the substrate a distance equal to at least two image lines after each scanning motion of the ink jet head means in a predetermined sequence so that no image line is printed adjacent to another image line printed during the same scan of the ink jet head means or during the immediately preceding scan of the ink jet head means, thereby avoiding thermal interaction between ink drops projected onto the substrate during successive scans.

19. An ink jet system according to claim 18 wherein the average width of image segments produced by adjacent image lines printed in the same scanning direction of the ink jet head means is no more than about one half millimeter.

20. An ink jet system according to claim 18 wherein the average width of image segments produced by adjacent image lines printed in the same scanning direction of the ink jet head means is no more than about one quarter millimeter.

21. An ink jet system according to claim 18 wherein the adjacent image lines produced during each scan of the ink jet head means are spaced by at least six image lines.

22. An ink jet system according to claim 18 wherein the adjacent image lines produced during each scan are spaced by at least eight image lines.

23. A method for operating a bidirectional color hot melt ink jet system to produce a colored image on a substrate comprising applying drops of different color hot melt inks from an ink jet head in a selected sequence to the same location on the substrate within about 100 milliseconds to cause mixing in the molten state of the last drop applied at the same location with the first drop applied at that location during motion of the ink jet head in one direction, and applying drops of the different color hot melt inks in the reverse of the selected sequence to another location on the substrate so that the last drop applied at the other location is applied within about 100 milliseconds after the first drop is applied during motion of the ink jet head in the opposite direction to cause mixing of the different color ink drops in the molten state.

24. A method according to claim 23 wherein ink drops are applied from a plurality of aligned arrays of orifices to produce image lines simultaneously and wherein the spacing between the image lines produced simultaneously corresponds to at least four image lines in the image produced by the system.

25. A method for operating a hot melt system to produce an image on a substrate comprising applying drops of different color hot melt ink to the same location on a substrate within about 100 milliseconds from a reciprocating ink jet head during motion of the head in either of two opposite directions along lines spaced by at least four image lines to cause mixing of the different color ink drops in the molten state, and advancing the substrate between successive scans of the ink jet head by a distance corresponding to at least two image lines.

26. A method according to claim 25 wherein the lines produced during each motion of the ink jet head are spaced by six image lines.

* * * * *

UNITED STATES PATENT AND TRADEMARK OFFICE
CERTIFICATE OF CORRECTION

PATENT NO. : 5,075,689

DATED : December 24, 1991

INVENTOR(S) : Hoisington et al.

It is certified that error appears in the above-identified patent and that said Letters Patent is hereby corrected as shown below:

Column 5, lines 33-34: "(0.5 mm) and 1.25 mm)" should read --(0.5mm and 1.25mm)--.

Column 6, line 42: "that," should read --that, when an image consisting only of black ink is printed and no--.

Signed and Sealed this

Eighteenth Day of May, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,075,689
DATED : Dec. 24, 1991
INVENTOR(S) : Paul A. Hoisington et al It is certified that error appears in the above-indentified patent and that said Letters Patent is hereby corrected as shown below:

Column 9, line 20: "claim 2" should read --claim 1--.

Signed and Sealed this

Fourteenth Day of September, 1993

Attest:

BRUCE LEHMAN

Attesting Officer     Commissioner of Patents and Trademarks